(12) United States Patent
Ismail et al.

(10) Patent No.: US 6,614,987 B1
(45) Date of Patent: Sep. 2, 2003

(54) TELEVISION PROGRAM RECORDING WITH USER PREFERENCE DETERMINATION

(75) Inventors: Labeeb K. Ismail, Fremont, CA (US); Amar N. Gogoi, Fremont, CA (US); Yuri Stupak, Fremont, CA (US)

(73) Assignee: Metabyte, Inc., Cupertino, CA (US)

( * ) Notice: Subject to any disclaimer, the term of this patent is extended or adjusted under 35 U.S.C. 154(b) by 0 days.

(21) Appl. No.: 09/096,592

(22) Filed: Jun. 12, 1998

(51) Int. Cl.⁷ .......................... H04N 5/91; H04N 5/445; G06F 3/00; G06F 13/00
(52) U.S. Cl. ........................................... 386/83; 725/46
(58) Field of Search ....................... 386/1, 83; 348/906; 725/45–47

(56) References Cited

U.S. PATENT DOCUMENTS

| | | | |
|---|---|---|---|
| 5,371,551 A | * 12/1994 | Logan et al. ............... 386/112 |
| 5,483,278 A | * 1/1996 | Strubbe et al. ............... 725/61 |
| 5,635,989 A | * 6/1997 | Rothmuller ................. 348/906 |
| 5,699,473 A | * 12/1997 | Kim ........................... 386/109 |
| 5,701,383 A | * 12/1997 | Russo et al. ................... 360/63 |
| 5,704,017 A | 12/1997 | Heckerman et al. .......... 395/61 |
| 5,754,651 A | * 5/1998 | Blatter et al. ............... 380/241 |
| 5,758,257 A | * 5/1998 | Herz et al. .................. 725/116 |
| 5,758,259 A | * 5/1998 | Lawler ......................... 725/45 |
| 5,761,371 A | * 6/1998 | Ohno et al. ................... 386/46 |
| 5,801,747 A | 9/1998 | Bedard ........................... 348/1 |
| 5,867,226 A | * 2/1999 | Wehmeyer et al. ........ 348/906 |
| 5,898,456 A | * 4/1999 | Wahl ........................... 725/91 |
| 5,953,073 A | * 9/1999 | Kozina et al. ................. 386/1 |
| 5,977,964 A | * 11/1999 | Williams et al. .............. 386/83 |
| 6,018,612 A | * 1/2000 | Thomason et al. .......... 386/125 |
| 6,091,883 A | * 7/2000 | Artigalas et al. ............. 386/83 |
| 6,157,772 A | * 12/2000 | Kim ............................. 386/83 |
| 6,169,842 B1 | * 1/2001 | Pijnenburg et al. ......... 386/109 |
| 6,233,389 B1 | 5/2001 | Barton |
| 6,304,714 B1 | * 10/2001 | Krause et al. .............. 386/125 |
| 6,324,338 B1 | 11/2001 | Wood |

FOREIGN PATENT DOCUMENTS

| | | | |
|---|---|---|---|
| EP | 0 705 036 A2 | 4/1996 | ............ H04N/7/08 |
| EP | 0 823 815 A2 | 2/1998 | .......... H04N/5/445 |
| EP | 0 838 951 A2 | 4/1998 | ............ H04N/7/16 |
| EP | 0 909 095 | 4/1999 | |
| WO | WO 94/13107 | 6/1994 | ............ H04N/7/16 |
| WO | WO 95/01057 | 1/1995 | ............ H04N/7/16 |
| WO | WO 96/31980 | 10/1996 | .......... H04N/5/445 |
| WO | WO 97/48230 | 12/1997 | ............ H04N/7/00 |
| WO | WO 98/28906 | 7/1998 | |

OTHER PUBLICATIONS

*Oracle Lite, The Client Database for Java;* by Oracle Lite, Jun. 5, 1998.
*API Requirements for the Advanced Set–Top Box,* by Open-Cable, Jun. 5, 1998.
*The Challenges of Convergence for Set–Top Box Manufacturers;* IBM Microelectronics, Jun. 5, 1998.

(List continued on next page.)

Primary Examiner—Thai Tran
Assistant Examiner—Polin Chieu
(74) Attorney, Agent, or Firm—Kenneth L. Sherman, Esq.; Myers Dawes Andras & Sherman; Joseph C. Andras, Esq.

(57) ABSTRACT

A system for recording television programs for subsequent viewing by a user includes a preference determination module which is responsive to attribute information associated with television programs viewed by the user. The preference determination module categorizes the attribute information in accordance with categorization parameters to generate recordation preference information, indicative of television program viewing preferences of the user. The system also includes a recordation module which is responsive to the recordation preference information, for causing recordation on a storage medium of subsequently transmitted television programs, having attribute information corresponding to the recordation preference information.

22 Claims, 10 Drawing Sheets

OTHER PUBLICATIONS

*White Paper, Set–Top Box Solutions: Helping Customers Meet the Challenge of Convergence;* IBM Microelectronics, Jun. 5, 1998.
*Set–Top Box Peripheral Chip;* IBM Microelectronics, Jun. 5, 1998.
*Set–Top Box Reference Design Kit;* IBM Microelectronics, Jun. 5, 1998.
*Set–Top Box Solutions;* IBM Microelectronics, Jun. 5, 1998.
*OpenTV Operating Environment, Technical White Paper,* OpenTV, Inc., Jun. 8, 1998.
*Application Development for OpenTV,* Technical White Paper, OpenTV, Inc., Jun. 8, 1998.

STARSIGHT: *The Interactive On–screen TV Program Guide Service With One–button VCR programming;* StarSight Telecast, Inc., Jun. 9, 1998.
*StarSight: An Introduction,* StarSight Telecast, Inc., Jun. 9, 1998.
*Services for On–Screen Guides;* TVData, Jun. 9, 1998.
*The Largest Databases of Television Information in the World,* TVData, Jun. 9, 1998.
Kageyama et al, "A Free Time_Shift DVD Video Recorder"; Aug. 1997, IEEE pp. 463–473.*

* cited by examiner

TELEVISION PROGRAM RECORDING WITH USER PREFERENCE DETERMINATION

FIELD OF THE INVENTION

This invention relates generally to the field of recording of broadcast type television programs by viewers for subsequent viewing.

BACKGROUND OF THE INVENTION

Currently, recording of television programs by individuals for viewing at a later time, is generally performed using commercially available Video Cassette Recorders (VCRs). Typically, a VCR may be either manually placed into a record mode or may be programmed to record a selected program at a later time. To program the VCR, the user either enters a date, time and channel of the program desired to be recorded, or enters an identification code of the desired program.

Viewers of television programming increasingly have more choices as to which programs to view. For example, cable television provides a dramatic increase in the number of channels available to a viewer in comparison to the channels available by way of a conventional television antenna. Digital satellite systems provide even more viewing choices. Digital broadcast of programs over cable television systems is expected to further increase the number of channels available to viewers.

One effect of the increase in the number of viewing choices is increased difficulty in deciding which programs to watch. People, particularly those with busy schedules, may not have the time to select and view programs to determine which programs they may or may not like. Programs that may otherwise be desirable to a viewer may never be watched if the program is broadcast at a time that is inconvenient for the viewer. User's may select certain programs for viewing to determine if they like the program. However, with several hundred program selections each week, this task can take a considerable amount of time and is likely to cause certain desirable programs to be overlooked.

It would therefore be desirable to have a system that automatically determines which programs to record based on user viewing preferences. Ideally, appropriate programs matching the user's viewing preferences could then be recorded, thus relieving the user from the task of selecting programs to record from among potentially hundreds of program selections.

SUMMARY OF THE INVENTION

In a principal aspect, the present invention determines viewing preferences of a user by monitoring programs viewed by the user and causes recording of programs corresponding to the user's preferences. In accordance with the principles of the present invention, apparatus for causing recordation of television programs comprises a preference agent for causing retrieval of attribute information corresponding to each television program viewed by a user of the apparatus. The preference agent generates classification information indicative of viewing preferences of the user as a function of the attribute information. A recording manager causes recordation and storage to a storage device of television programs having attribute information that matches the classification information.

Embodiments employing the principles of the present invention advantageously cause recordation of programs that match certain viewing habits of the viewer. Such embodiments therefore provide the viewer with stored programs that match certain viewing preferences of the user, which can be viewed at the viewer's leisure. The viewer is therefore relieved of the burden of deciding which programs from among several hundred possible programs to watch.

In accordance with a further aspect of the present invention, programs may be recorded for storage in accordance with available capacity of the storage device. Moreover, programs may be deleted in response to selections by the user or based upon a priority, indicated by viewing preferences of the user, in which programs having lowest priority are deleted first to make room for newly recorded programs. The priority of programs may also be a function of time, in which more recently recorded programs are given higher priority.

In accordance with further aspects of the invention, determining which programs to record may also be a function of priority in which programs specified for recordation are given highest priority, followed by programs having attribute information corresponding to one or more user specified criteria, then followed by programs having attribute information corresponding to the recordation preference information.

In accordance with further aspects of the invention, the user specified requests may be in the form of a first type of request comprising information indicative of a specific program and a second type of request comprising specifications indicative of one or more programs having attribute information corresponding to the user's specifications.

In accordance with further aspects of the invention, the user may cause recordation of a currently broadcasted program being viewed by the user by causing generation of a pause input. This advantageously allows a user to interrupt viewing of a currently broadcasted program by recording the remainder of the program for subsequent viewing. Program viewing options may be presented to the user in the form of a menu that provides an easy to use interface for selection of programs and viewing and other options including play, pause, delete, fast-forward, rewind and so forth.

Preferably, the preference agent organizes the recordation preference information in the form of a database organized in accordance with categorization parameters. Programs may be received in either analog or digital formats. Programs stored in digital format are advantageously presented to the user in the form of additional channels. This allows the user to easily switch between programs (either recorded or broadcast) simply by switching channels.

These and other features and advantages of the present invention may be better understood by considering the following detailed description of a preferred embodiment of the invention. In the course of this description, reference will frequently be made to the attached drawings.

DETAILED DESCRIPTION OF THE PREFERRED EMBODIMENTS

Figure 1:
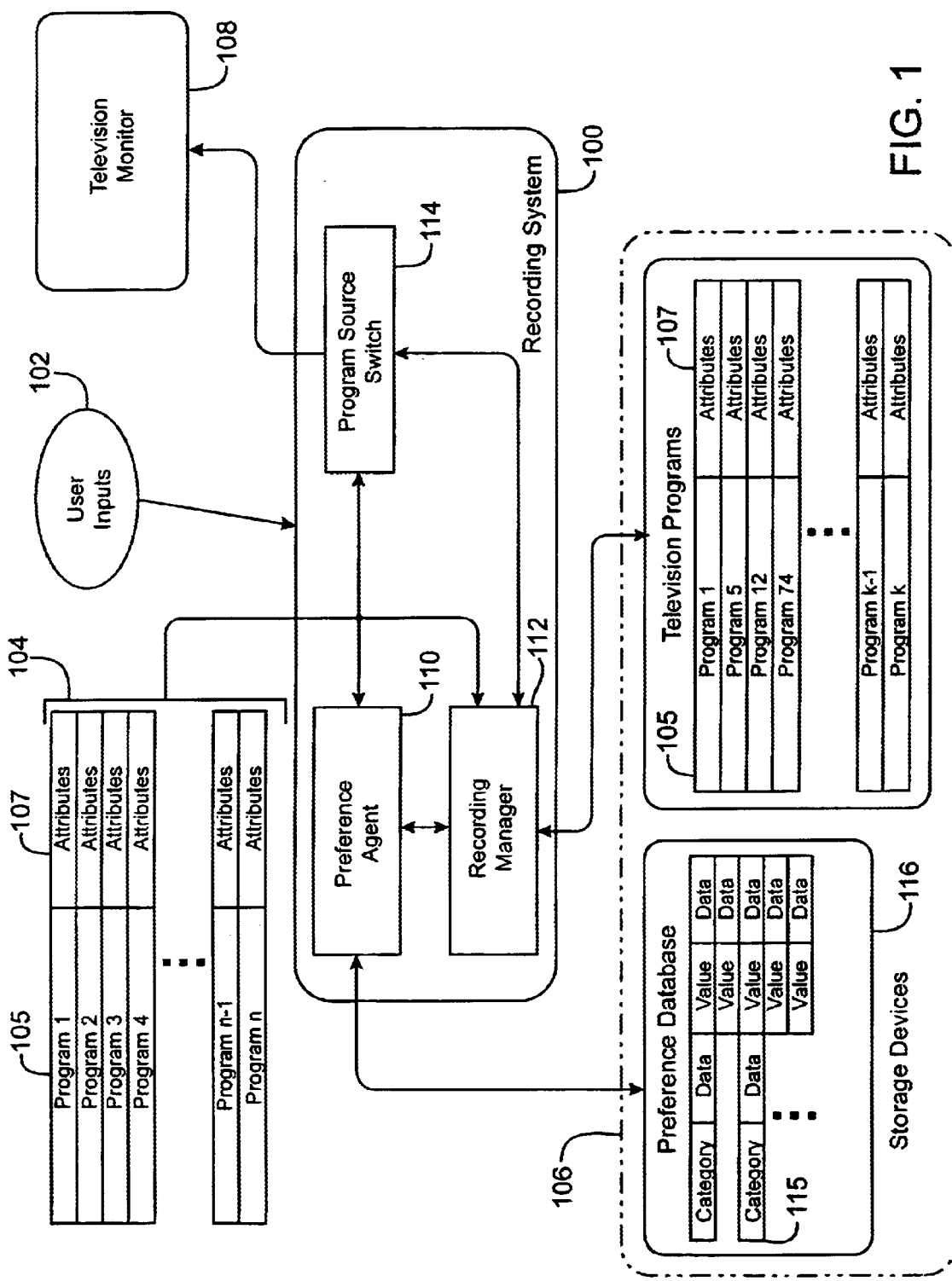
FIG. 1 is a high-level block diagram of a system employing the principles of the present invention.

In FIG. 1, a television control system 100 operates in accordance with the principles of the present invention to cause recordation of television programs in response to user inputs 102 and television signals 104. Television control system 100 transmits signals to a television monitor 108 for viewing by the user. Preferably, in digital embodiments, programs that are recorded by system 100 are presented to the user in the form of additional channels. Thus, the user can rapidly determine, by changing channels, the stored programs that are available for viewing. The user can also change channels between stored programs or between stored programs and currently broadcasted programs. If the user changes channels from a recorded program to another program, playback of the recorded program is preferably paused. Alternatively, whether the playback of the recorded program is paused or continued, is a user selectable option. As described further herein, the user may specify programs for recordation by specification of a particular program, or by specification of particular attributes of the program such as comedy/drama, actor(s). When manually specifying programs for recordation, the user may specify that the program is to be recorded once or repeatedly, such as weekly, when broadcast.

Signals 104 include a first component 105 which contains the information necessary to display video and audio components of a television program on television monitor 108. Signals 104 preferably also include a second component 107 termed herein "attribute information." An example of such attribute information 107 is the information available by way of the DVB-SI and ATSC-SI formats and various proprietary formats such as StarSight EPG Data and TVData available from StarSight Telecast, Inc., Fremont, Calif., and TVData, Glen Falls, N.Y., respectively.

Attribute information 107 for any particular program varies depending on the program type, but typically includes a plurality of categories such as start time for the program, duration of the program, the title of the program and other attributes (categories) of the program, together with an associated value corresponding to each of the categories. Preference agent 110 processes the attribute information 107 to generate "category-value" pairs 115. For example, if an attribute for a program is duration, then the category may be duration and the value for that category may be 120 minutes. If the attribute for a program is title, then the category may be title and the value may be "Star Wars." Other category-value pairs for a movie may include a description category with a short description of the movie being the value, a primary actor category with the names of the primary stars of the movie being the values, a director category with the name of the director being the value, a theme category with the theme such as adventure, comedy being the value, and a ratings category with ratings by particular critics being the value. Category-value pairs for a sports game, such as a football game, may include names of the teams who are playing, the location of the game, and the specific tournament, such as the play-offs, or Superbowl, etc.

The category-value pairs 115 (preference information) are indicative of viewing preferences of the user. The data shown in FIG. 1 as being associated with the category-value pairs 115 contains weighting information for the associated category value, in addition to other information shown by way of example further below. Preference agent 110 maintains the preference information 115 in the form of a preference database 116. Television programs 105 recorded by the system 100 are preferably stored separately together with the associated attribute information 107. In an alternative embodiment, the category value pairs 115 (with or without the associated values) are stored with the television programs 105 and the raw attribute information 107 is not maintained by the system 100.

Preference agent 110 generates, in response to user viewing habits, data for each category stored in preference database 116 and for each value of each category. The data generated by preference agent 110 for each category and value is preferably indicative of the amount of time that the particular category and/or value is watched by the user relative to the total amount of time that the particular category and/or value is available to be watched. The relative amount of time that a program is watched by a user is a convenient indication of the user's relative viewing preference. However, other indications of user viewing preferences may also be used. Program source switch 114 operates in response to user inputs 102 to select either presently broadcasted programs, by way of television signal 104 or stored programs from storage devices 106.

Recording manager 112 operates to cause recordation and storage of television programs 105 and attribute information 107 in accordance with information generated by preference agent 110 and stored in preference database 116. Recording manager 112 also responds to user requests to record particular programs and to user requests to record programs having specified category-value pairs.

The signals transmitted to the monitor 108 preferably take a conventional analog form. Alternatively the signals transmitted to the monitor 108 maybe digitally encoded. The exact form of the signals transmitted to the monitor is not critical and may take a form as required by a particular monitor. The television signals 104 received by the television control system 100 may take one of a variety of signal formats including analog encoded signals that are encoded in accordance with the well known NTSC or PAL standards. Alternatively, the signals 104 may be digitally encoded in a manner as transmitted by commercially available digital satellite systems (DSS) or in accordance with the MPEG-2 (Motion Picture Expert Group-2) standard. In any given embodiment of television control system 100 the signal 104 may take a variety of the aforementioned forms. For example, television control system 100 may be coupled to receive inputs from a digital satellite system, the inputs being digitally encoded. The television control system 100 may also be coupled to receive inputs from a Community Antenna Television System (CATV) in which the signals are either encoded in analog or digital form. The television control system 100 may also be coupled to receive analog or digital signals from a conventional home antenna.

The attribute information 107 may be transmitted to the television control system 100 contemporaneously with the television program 105 in a variety of ways including industry standards, such as DVB-SI (Digital Video Broadcasting-Service Information) as defined by the European Telecommunication Standards Institute (ETS), or the ATSC digital television standard as defined by the Advanced Television System Committee (ATSC). By way of example, in the DVB-SI protocol, programming for the next six hours is transmitted every eight seconds for each channel. As a further example, program information for the next seven days is available from the interactive on-screen TV program guide available from StarSight Telecast, Inc. Programmning information further into the future, such as for the next seven days, may also be obtained in other ways. For example, by receiving the information in a time-multiplexed manner over a particular channel. Such information can easily be transmitted when the user is performing an action that does not require a moving video image on the screen, such as when the user has a control menu displayed on the screen.

Alternatively, television control system 100 can download the attribute information 107 separately from the television program 105 by way of a separate communication session via a modem or the Vertical Blanking Intervals (VBI) contained 15 in television signals. Such separate communication sessions include data download mechanisms supported by the MPEG-2, DVB-SI and DSS protocols.

The attribute information 107 can take a form under the DVB-SI protocol as shown below:

event_id,
start_time.
duration,
DESCRIPTOR1,
DESCRIPTOR2,
. . .
. . .
DESCRIPTORn.

The event_id field is a unique alpha-numeric code assigned to a program. DESCRIPTORS can be "Short Event Descriptors," "Extended Event Descriptors" or "Content Descriptors" which include the following information:

```
Short Event Descriptor:
{
    event_name_length
    event_name,
    event_description_length
    event_description
}
Extended_event_descriptor:
{
    ITEM1,
    ITEM2
    ...
    ...
    ITEMn.
}
content descriptor:
{
    CONTENT1,
    CONTENT2,
    ...
    ...
    CONTENTn.
}
```

ITEMs include the following information:

```
{
    item_description_length,
    item_description,
    item_value_length,
    item_value
}
```

An example of item descriptions can be "Director" and item value can be "Martin Scorcese". CONTENT includes the following information:

```
{
    DVB-SI defined theme,
    DVB-SI defined sub-theme,
    programmer defined theme,
    programmer defined subtheme,
}
```

An example of theme and subtheme are MOVIE and COMEDY, respectively. The programmer defined theme and sub-theme are values that may be provided by the EPG Data provider.

Category-value pairs 115 are generated from the above type of information. The category-value pairs 115 take the following format: Category Name—Category Value, where category name can be "Title", "Director", "Theme", "Program Type" etc. and category values can be "Seinfield" "Martin Scorcese", "Comedy", "Sitcom" etc. Generation of category-value pairs 115 from attribute information 107 allows generation by preference agent 110 of categories that are not explicitly present in the attribute information 107. For example, category-value pairs 115 can be: Title-49 ers, Description-football, and Description Search Rule-football (AND) San Francisco. Thus, preference agent 110 is capable of generating category-value pairs 115 from attribute information 107 even where there is no field in the attribute information that corresponds to the created category-value pair.

Preference database 116 is preferably generated initially by downloading category-value pairs from a third-party source such as StarSight Telecast, Inc. Advantageously, such sources may provide information customized for particular geographical areas and dates. For example, the database may contain data that gives sporting events involving local teams higher ratings than other sporting events. In addition, seasonal or holiday programs may be indicated as being preferred during particular seasons or holidays. For example, programs involving summertime activities would be indicated as having higher weighting during the summer than at other times of the year. The preference database is modified as described herein in accordance with the user's viewing habits. In addition, the preference database can be periodically updated from third-party sources to reflect the aforementioned seasonal or holiday updates.

Categories in the preference database 116 are either predefined, such as those received from third-party sources, or are dynamically created from attribute information 107 received for programs 105. Categories, and associated values, that are dynamically created are preferably given a default rating by preference database 116. An example of the preference information created by preference agent 110 or downloaded to preference agent 110 is shown below. In the following example, the three columns of numbers in the category statistics and value statistics portions indicate weighting (in a range of 0 to 1000), duration watched (in seconds) and amount of time that programs matching that particular category or value was available (in seconds). The information is preferably stored in the form of database records.

Categories:

| | |
|---|---|
| channel | 1000 |
| title | 1001 |
| title-Substring | 1002 |
| genreInfo | 1003 |
| description | 1004 |
| descSubString | 1005 |
| episodeName | 1007 |
| type | 1008 |
| stars | 1009 |
| director | 1010 |
| YearProduced | 1011 |
| MPAARATING | 1012 |
| criticRating | 1013 |

Values:

| | |
|---|---|
| Titanic | 2000 |
| Ami | 2001 |
| 3rd Rock From the Sun | 2002 |
| The Gods Must Be Crazy | 2003 |
| Seinfeld | 2004 |
| Headline News | 2005 |
| Bugs & Daffy | 2006 |
| News | 2007 |
| 004 | 2008 |
| 005 | 2009 |
| 063 | 2010 |
| 49ers | 2011 |
| SITCOM | 2012 |
| COMEDY | 2013 |
| MOVIE | 2014 |
| NEWS | 2015 |
| Sanfrancisco 49ers | 2016 |
| A Coke bottle raises havoc for a tribe of African bushmen | 2017 |
| John Mayers | 2018 |
| Lousie Barnett | 2019 |
| Marius Weyers | 2020 |
| Sandra Prinsloo | 2021 |
| Jeff Bridges | 2022 |
| Valerie Perrine | 2023 |
| Phil Hartman | 2024 |
| Jamie Uys | 2025 |
| Lamont Johnson | 2026 |
| 1981 | 2027 |
| 1973 | 2028 |
| 1996 | 2029 |
| THREESTAR | 2030 |
| TWOSTAR | 2031 |
| NUDITY | 2032 |
| VIOLENCE | 2033 |
| ADULTSITUATIONS | 2034 |
| ADULTLANGUAGE | 2035 |

Category - Value pairs:

| | |
|---|---|
| 1001 | 2001 |
| 1001 | 2002 |
| 1001 | 2003 |
| 1001 | 2004 |
| 1001 | 2005 |
| 1001 | 2008 |
| 1000 | 2009 |
| 1000 | 2010 |
| 1002 | 2011 |
| 1003 | 2012 |
| 1003 | 2013 |
| 1003 | 2014 |

Category statistics:

| | |
|---|---|
| 1001 | 1000 31104 4022280 |
| 1002 | 1000 31104 4022280 |
| 1003 | 1000 31104 2613384 |
| 1004 | 1000 20304 1996596 |
| 1005 | 1000 20304 1996596 |
| 1006 | 1000 5238 1259028 |
| 1007 | 1000 3438 369450 |
| 1008 | 1000 13266 812970 |

Value Statistics

| | |
|---|---|
| 2001 | 1000 1638 88074 |
| 2002 | 1000 6714 178560 |
| 2003 | 1000 6552 387054 |
| 2004 | 1000 5400 165600 |
| 2005 | 1000 1800 9000 |
| 2006 | 1000 3600 28800 |
| 2011 | 500 1800 10800 |

In the above example, fourteen categories are provided (1000–1013) followed by thirty-six values. The correspondence between the categories and values (category—value pairs) is next shown. Data for the categories and then the values is shown next. This data is organized in three columns as described above.

Preference ratings for programs are preferably computed by preference agent 110 from data stored in preference database 116 in accordance with the following formula:

$$Rating = \frac{\sum_i W_{vi} * W_{c(vi)} * \frac{DW_{vi}}{DA_{vi}}}{\sum_i W_{vi} * W_{c(vi)}}$$

where, $W_{v_i}$=weighting of $i^{th}$ value;

$W_c(v_i)$=weighting of the category corresponding to the $i^{th}$ value;

$DW_{v_i}$=duration watched for the $i^{th}$ value;

$DA_{v^i}$=duration availability for the $i^{th}$ value.

The summations shown in the above equation are performed for all values of i, where $v_i$ is a value in a category-value pair derived from the attribute information for the program.

The above formula is merely an example formula for computing preference ratings. The above formula may be modified in a number of ways to achieve different preference ratings. For example, certain category-value pairs may be weighted in the formula to achieve certain preference objectives.

In the embodiment shown in FIG. 1 and described above, the ratings for categories and values are dynamically generated by the preference agent 110 instead of being stored the in preference database 116. In an alternative embodiment, the ratings may be stored in preference database together with the category-value pairs.

Television control system 100 is preferably implemented by way of a general purpose digital computer and associated hardware that executes stored programs to implement the functions shown within block 100 in FIG. 1. The exact hardware and software platforms on which the television control system 100 is implemented is not important and may take a variety of forms. For example, television control system 100 may be implemented in a set-top box such as may typically used by individuals in the home to receive CATV signals. Another implementation of television control system 100 is in the form of a personal computer configured with the requisite hardware and software to receive and display television signals. An example of a set-top box that maybe programmed in accordance with the principles described herein is described in the following documents by IBM Microelectronics: "Set-Top Box Solutions", Product #G522-0300-00 (Nov. 19, 1997); "Set-Top Box Reference Design Kit", GK10-3098-00 (Apr. 15, 1998); "Set-Top Box Peripheral Chip", GK10-3098-00, (Apr. 15, 1998); "Set-Top Box Solutions: Helping Customers Meet the Challenges of Convergence", G522-0300-00 (Nov. 19, 1997); and "The challenges of convergence for Set-Top Box manufacturers", G522-0302-00 (Nov. 19, 1997). An example of an Application Programming Interface (API) available for set-top boxes which can serve as a platform for the embodiments described herein is described in "API Requirements for the Advanced Set-Top Box" published by OpenCable (Oct. 21, 1997). An example of an operating system incorporating functionality to support the embodiments described herein is available from OpenTV, Inc. and is described in the following Technical White Paper publications by OpenTV, Inc.: "OpenTV™ Operating Environment" and "Application Development for OpenTV™." An advantage of such an operating system is the support provided in the form of function calls to obtain attribute information 107 from the signals 104. Alternatively, a general purpose operating system such as the Windows NT operating system from Microsoft Corporation may be used in conjunction with additional software that provides the functions required to extract the necessary information from attribute information 107 and to perform other manipulation of the received signals 104 and the stored information 105.

Storage devices 106 may include a variety of different types of storage devices. For example preference database 116 may be stored in a non-volatile, random-access semiconductor memory. Television programs 105 and attribute information 107 may be stored on storage devices having greater capacity such as a conventional magnetic, hard disk drive. In general, storage devices 106 are understood to encompass a variety of storage devices. The exact form of the storage devices 106 is not critical so long as the storage devices have the capacity and speed to store the necessary information. Storage devices 106 may also comprise a conventional video cassette recorder (VCR) which operates under control of system 100 to store television programs 105 and attribute information 107 on conventional magnetic tape.

For the purposes of the present description, the television control system 100 is presumed to be integrated into, or coupled to, a system including a tuner and other functions necessary to receive television signals and to extract the attribute information 107 from the television signal and to perform other functions typically associated with the receipt and viewing of television signals. In certain embodiments, television control system 100 may operate in conjunction with a database agent that facilitates interaction with preference database 116 by causing storage and retrieval of information to or from the database in an optimal manner. The preference database 116 may be implemented by a commercially available database product such as the Oracle Light database product available from Oracle Corporation which also incorporates the functionality to implement the data base agent described above.

Figure 2:
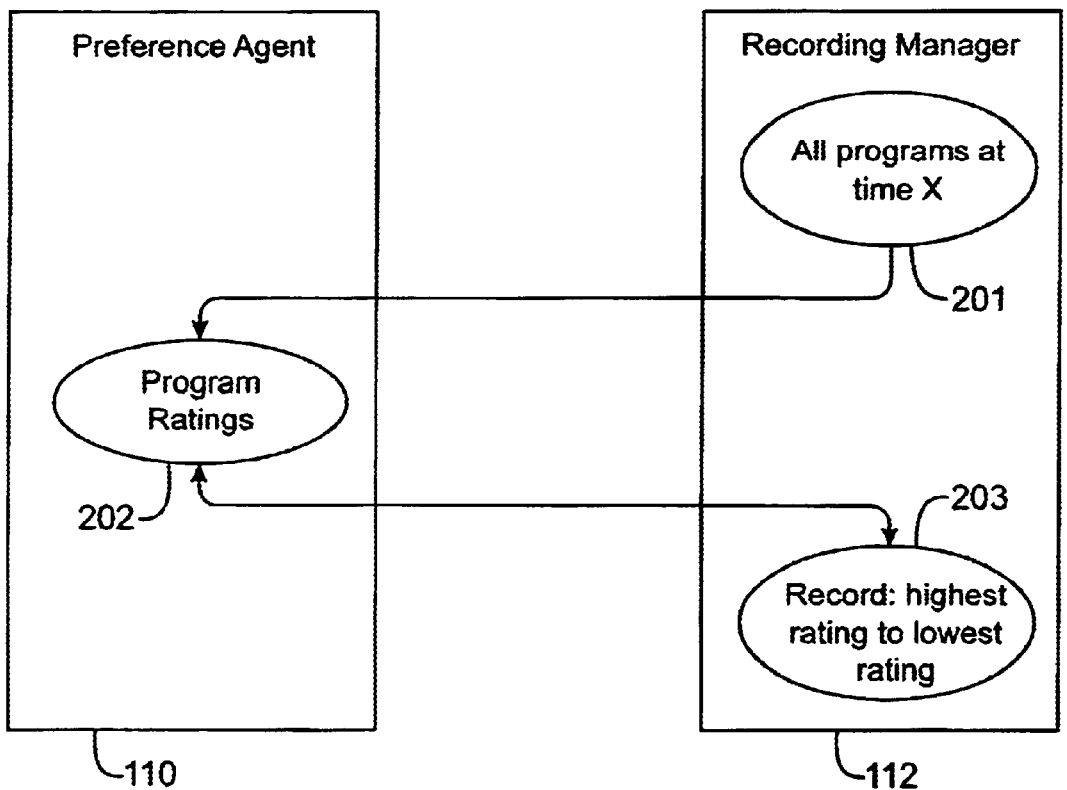
FIGS. 2 and 3 are block diagrams illustrating operation of certain functions performed by the television recording system of FIG. 1.

Recording manager 112 causes recording of programs 105 by periodically initiating a sequence of steps shown in FIG. 2. At 201, recording manager 112 sends a request to preference agent 110 for ratings of all programs at a particular time (X), or alternatively, for ratings of all programs within a particular time period (X). By way of example, the steps shown in FIG. 2 may be performed every six hours. In certain embodiments, the frequency with which the steps in FIG. 2 are performed may be changeable by the user.

Preference agent 110 responds at step 202 by providing ratings, from preference database 116, for each program received from recording manager 112. Recording manager 112 then causes recordation of the programs at time X, or within time period X in accordance with the ratings received from preference agent 110. Specifically, programs having the highest rating are given highest preference for recordation and programs having the lowest rating are given lowest preference to recordation. The recordation is subject to storage capacity constraints. For example, if the highest rated program is one-hour long, and only thirty minutes of recording space is available on storage devices 106, then the one-hour program is skipped and the highest rated thirty-minute program is recorded.

Highest priority for recording of programs is given to programs specifically requested by the user. For example, if the user identifies a particular program for recording, such as by specifying the date, time and channel, or by specifying an identification code for the program, recordation of that program is given priority over programs rated by the preference agent. Next highest priority is given to programs matching particular category-value pairs specified by the user. For example, if the user does not identify a particular program, but specifies that one-hour long documentaries pertaining to travel should be recorded, then recordation of programs matching such category-value pairs is given priority over programs rated by the preference agent 110. In alternative embodiments, relative priority between user-specified programs, user-specified category-value pairs and programs rated by the preference agent 110 is changeable by the user.

Figure 3:
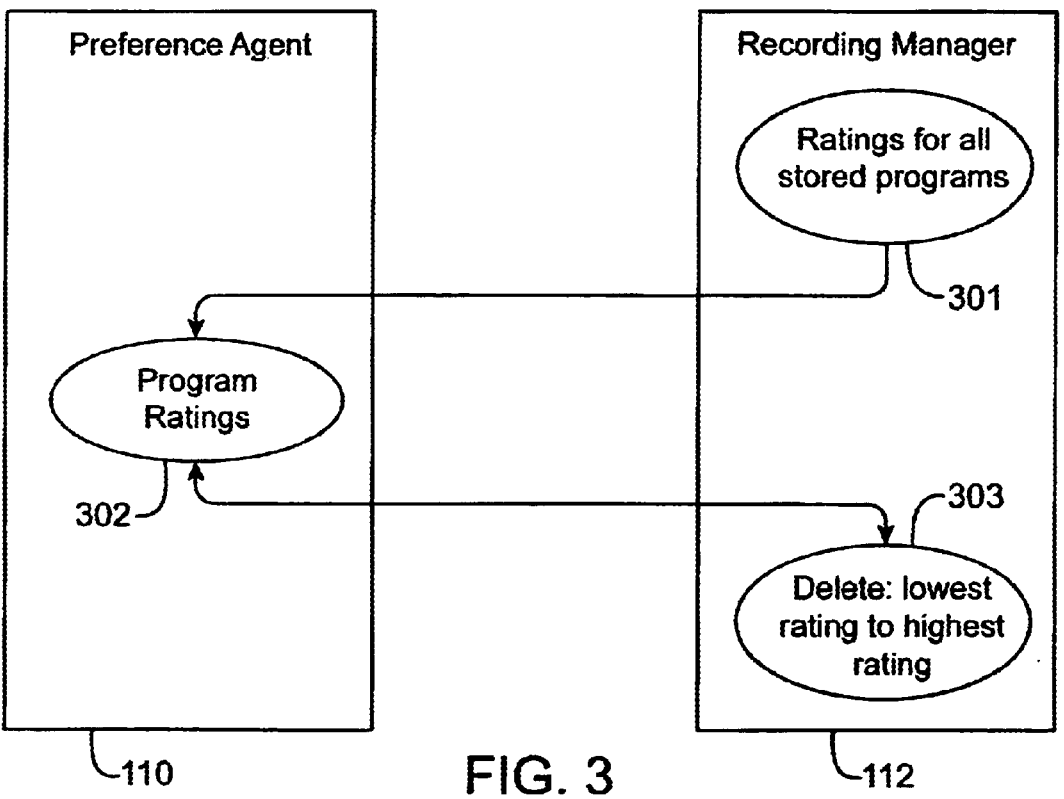

Recording manager 112 manages storage capacity on storage devices 106 by causing deletion of television programs 105 in accordance with ratings of such programs generated by preference agent 110. This is performed in a manner similar to that explained above for determining which programs to record. FIG. 3, which shows the steps taken by recording manager 112 to determine which programs to delete, is similar to FIG. 2. At step 301, recording manager 301 requests ratings from preference agent 110 of all programs stored on storage devices 106. At step 302, preference agent 110 responds by providing the requested deletion ratings. At step 303, recording manager 112 responds by causing deletion, when needed, of programs in accordance with the deletion ratings received from the preference agent 110. Specifically, when additional space on storage devices 106 is required to record one or more additional programs, recording manager 112 causes deletion, or overwriting of programs having the lowest rating first. Thus, stored television programs which are determined by preference agent 110 to be least preferable, in relation to other stored television programs, are deleted or replaced first, and those determined to be most preferable are deleted or replaced last. Deletion of programs occurs only when required. Advantageously, this results in storage device 106 typically being filled to maximum capacity, thus providing the user with as wide a variety of programs as possible. The user can specify programs that are to remain on the storage device 106. Such programs are not deleted by the recording system 100 in the steps shown in FIG. 3. In addition, the user can specify programs that are to be deleted, and therefore override the steps shown in FIG. 3.

Figure 4:
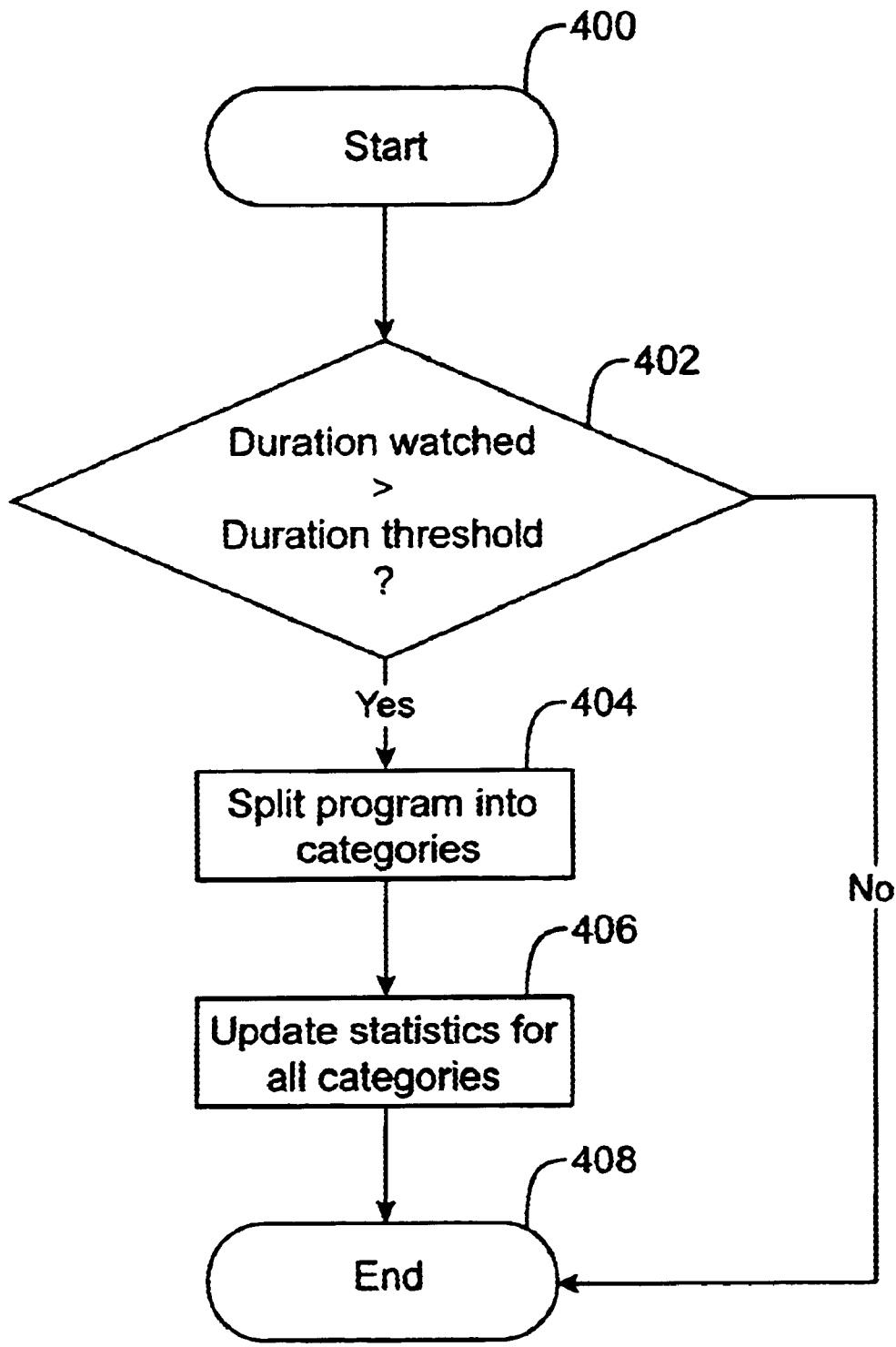
FIGS. 4, 5, 6, 7, 8(*a*) and 8(*b*) are flowcharts illustrating additional aspects of operation of the preference agent of FIG. 1.

FIG. 4 illustrates actions performed by preference agent 110 when the user watches a television program 105. The steps shown in FIG. 4 are termed herein a "Category Update Routine". The routine is entered at step 400 and at step 402, a duration threshold is checked to determine if the user has viewed the program for more than a predetermined minimum time threshold. This advantageously avoids updating of categories for programs which may be viewed very briefly for example by quickly sequencing through multiple channels to determine which programs are currently being broadcast. At step 404, the appropriate category-value pairs corresponding to the program are determined. For example, if the program being viewed is an action movie, then the program type category is assigned the value "movie", and the theme category is assigned the value "action." If the program being viewed is a situation comedy, then the program type category is assigned the value "SITCOM", and the theme category is assigned the value "comedy." At 406, the category-value pairs for the program being watched are used to update statistics for the categories and corresponding values stored in the preference database. The preference database 116 is therefore updated to reflect the user's viewing of the particular program. The duration threshold may be either predetermined and set or may be variable depending on user preferences. For example the user may be able to enter the duration threshold into the television control system 100 by way of a number of conventional means including a menu driven system presented on the television screen by the television control system 100 that prompts the user for specific information including the value of the duration threshold.

Figure 5:
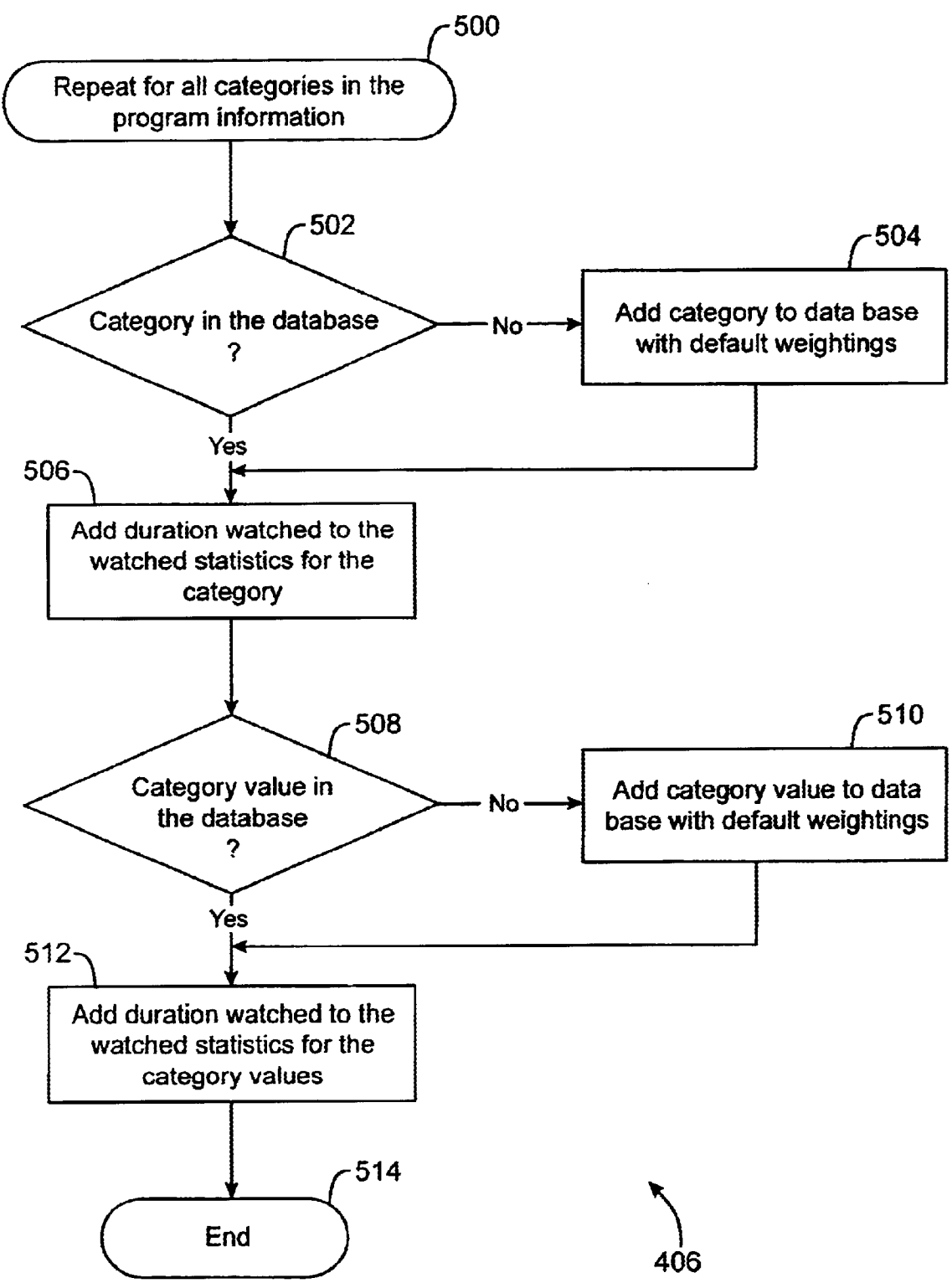

FIG. 5 shows in further detail, step 406 of updating statistics for the category—value pairs. As shown in step 500 the steps in FIG. 5 are repeated for all categories received by way of signal 104. First, at step 502, the category in question is checked with the categories in the database 116 to determine if that category is currently stored in the database. If the category is not stored in the database, then at step 504, the category is added to the preference database 116. The category is added to the database with a default weighting value. After step 504, or after step 502 if the category in question is in the database 116, the length of time or the duration for which the program in question is watched by the viewer is added to a watched statistics variable for the particular category. Next, at step 508, the database is queried to determine if the category value in question is currently stored in the database. If the category value in question is not stored in the database, then the database 116 is updated at step 510 with the category value in question. The category value is added to the database with a default rating. Next, or after step 508 if the category is in the database, at step 512, the duration for which the program was actually viewed is added to the watched statistics for the category value. The routine is then terminated at step 514.

Figure 6:
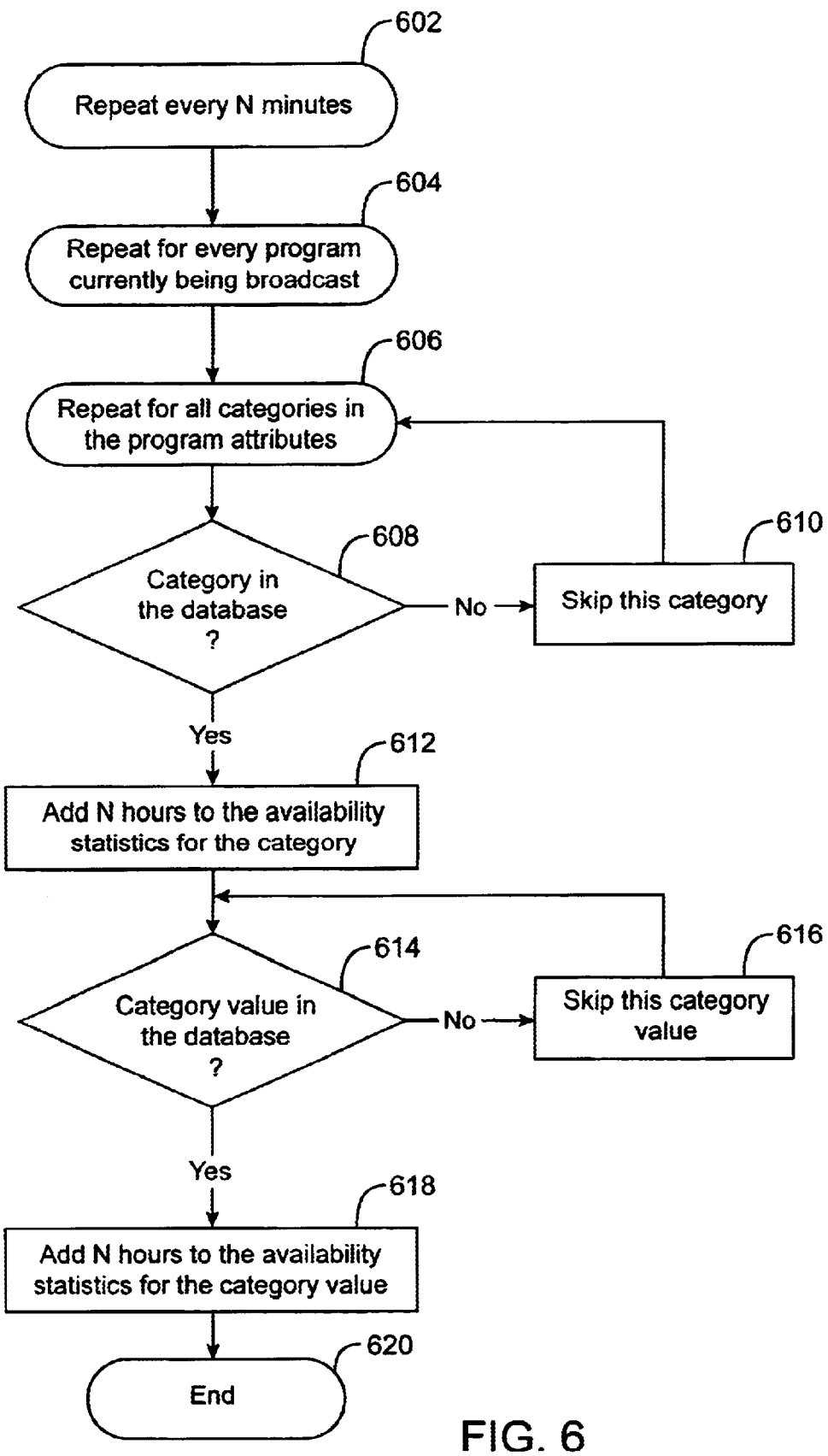

Availability statistics for programs currently being broadcast are updated by system 100 when the user is watching a currently broadcast program. The steps performed to implement this function are shown in FIG. 6. As shown in steps 602 and 604, the further steps in FIG. 6 are repeated periodically every few minutes for every currently broadcasted program. The frequency with which the steps in FIG. 6 are performed is preferably set to a default value that is then subsequently changeable by the user. As shown at step 606, the further steps are also repeated for all categories contained in the program attributes 107. At step 608, each category for the program in question is compared against the categories stored in the database 116. If the category is not in database 116, then that category is skipped, as shown at step 610. If the category is in the database, then the category is updated by adding the value N to the availability statistics for the category. Next at steps 614, 616 and 618, for each category value that is in the database the availability statistics for that category value are updated by adding the value N to each availability statistic. The routine is then terminated at 620. In the event that the same program is broadcast on two channels at the same time, the availability statistics for that program are updated only once, thus ignoring the dual or more concurrent broadcast of the program.

Figure 7:
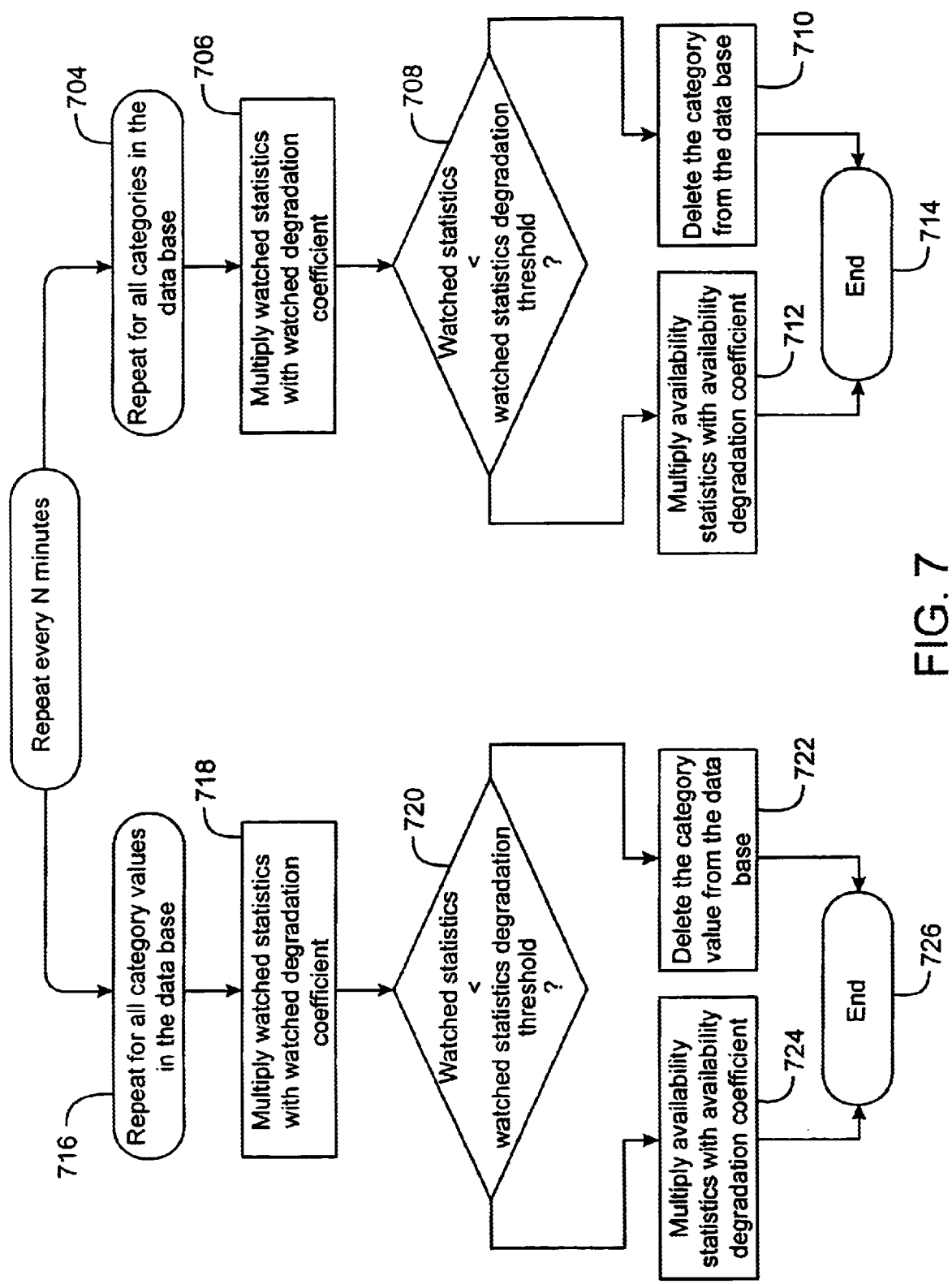

FIG. 7 illustrates in further detail the process by which statistics are downgraded (or aged) and invalidated. FIG. 7 shows two parallel paths. The path on 210 the right, with reference numerals 704–714, are the steps to downgrade and invalidate categories in the database 116. On the left, steps 716 to 726 are the steps to degrade and invalidate category values in the database. The steps performed for each path 704 to 714 or 716 to 726 are identical. Accordingly, only steps 704 to 714 are explicitly described herein with the understanding that step 716 to 726 operate in an identical fashion for category values as opposed to categories. As seen at step 704, the subsequent steps are repeated for all categories in the database 116. First, at step 706, the watched statistics are multiplied with a watched degradation co-efficient. The watched degradation co-efficient is preferably set to a default value that is then changeable by the user. The watched degradation co-efficient reflects an amount by which a program that is watched by the user is degraded in priority for deletion from storage. At step 708, a test is performed to determine if the watched statistics is less than a watched statistics degradation threshold value. If so, then at step 710 the particular category is deleted from the database 116. Therefore, if a particular category has not been watched for a period of time by the user, then the watched statistics for that category will eventually fall to below the watched degradation threshold, at which point that category will be deleted as shown in step 710 from the database. In certain embodiments the watched degradation threshold may be user programmable. At step 712, the availability statistics are multiplied with an availability degradation co-efficient that is indicative of an amount by which statistics are aged over time. The routine is exited at step 714. In certain embodiments the availability degradation coefficient may differ for different categories. This advantageously allows different categories to be aged at different rates. In certain embodiments, the various availability degradation coefficients may be user changeable. As noted above, steps 716 to 726 operate in a similar fashion for category values.

Figure 8A:
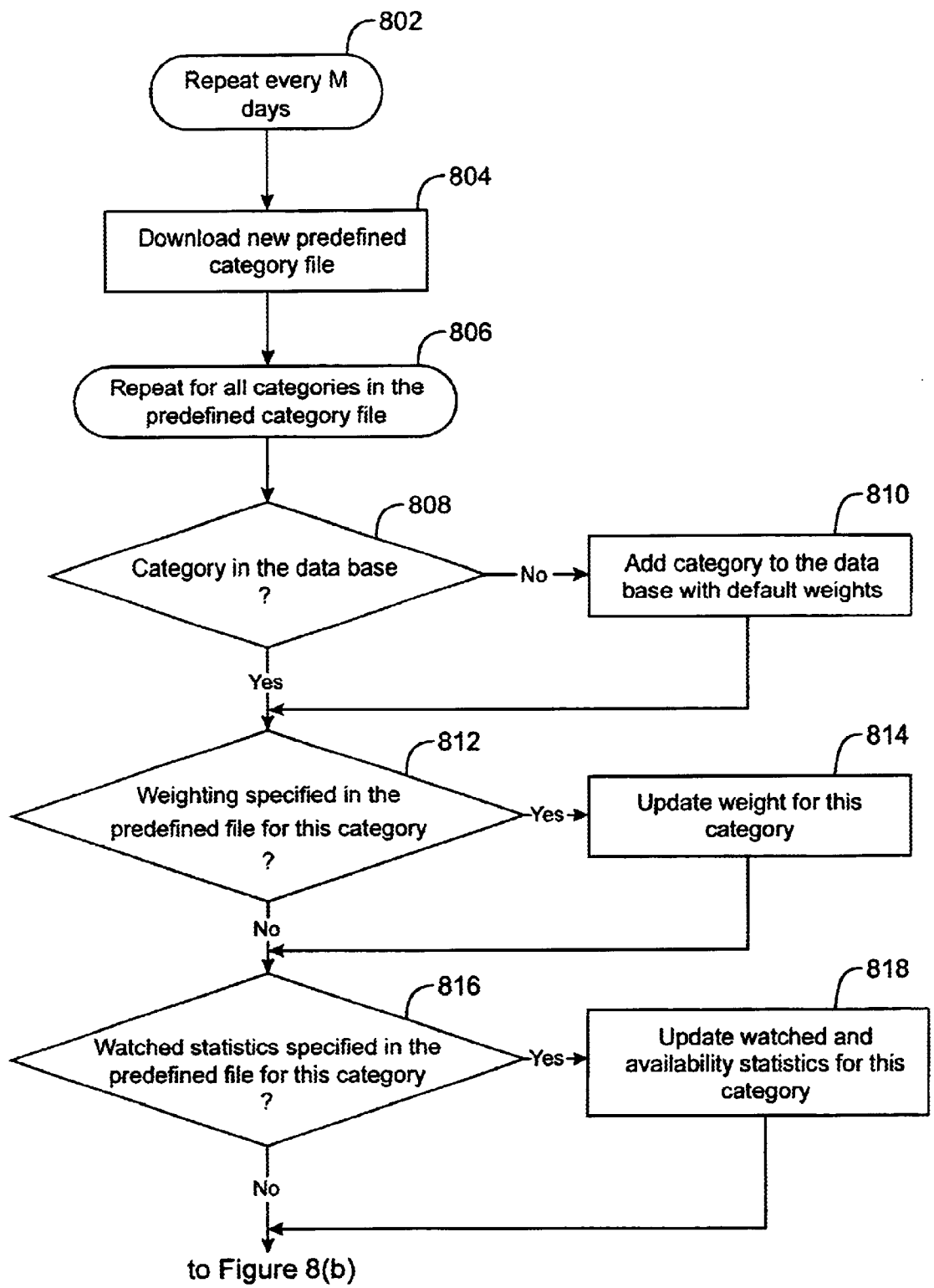

FIGS. 8(*a*) and 8(*b*) show the steps performed to update predefined categories and values stored in database 116. As shown in step 802 the steps in FIGS. 8(*a*) and 8(*b*), are repeated periodically every M days. The value M is preferably set to a default value, which then may be subsequently be modified by the user. First, at step 804, a predefined category file is downloaded by the television control system 100. This may occur in a number of ways, as previously described, such as, for example, by use of the vertical blanking interval (VBI), or in a separate communication session by use of a modem. As shown in step 806 the subsequent steps are repeated for all categories contained in the predefined category file. At step 808 each category in the predefined category file is checked to determine if that category is in the database 116. If the category is not in the database than it is added in step 810 with default weighting. If the category is in the database, or after step 808, a test is done at step 812 to determine if the predefined file contains a weighting for the particular category. If so, then at step 814 the particular weighting is updated in the database. At step 816, a test is performed to determine if there is a watched statistic specified in the predefined file for the particular category. If so, then at step 818 watched and availability statistics are updated for the particular category.

Figure 8B:
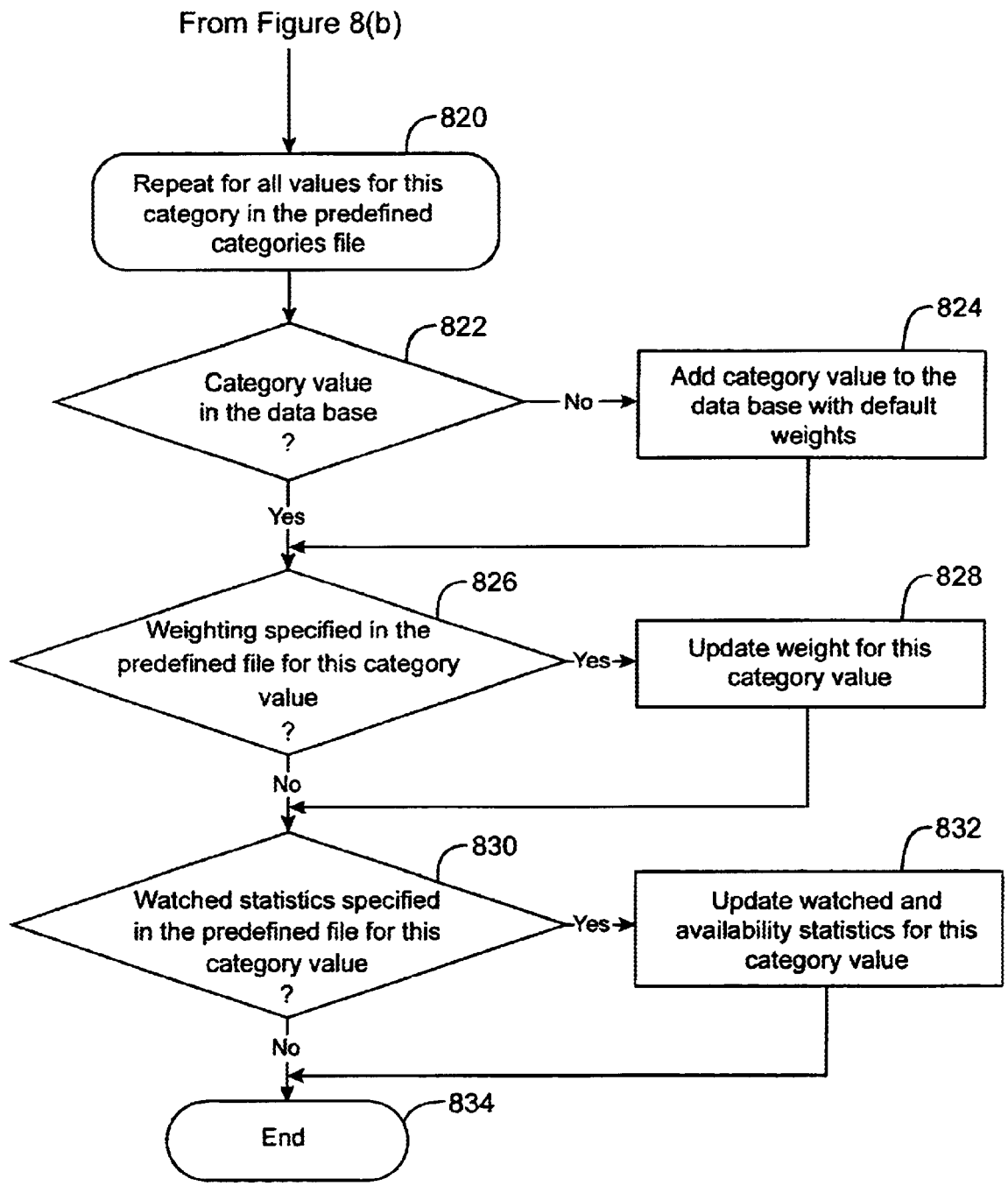

Continuing to FIG. 8(b), as shown in step 820, the subsequent steps are repeated for all values for the particular category. At step 822, the database 116 is checked for each category to determine if there is a category value corresponding to the particular category in the database 116. If not, then at step 824 the category value is added to the database 116 with default weighting. If so, or after step 824 is completed, a test is performed at step 826 to determine if there is weighting specified in the predefined file for the category value. If so, then the weighting is updated for the category value in the database 116. If not, or after step 826, a test is performed at step 830 to determine if there is a watched statistic specified in the predefined file for the category value. If so, then at step 832 the watched availability statistics are updated for the category value. The routine is terminated at 834.

In certain embodiments, the preference database is used by system 100 to alter the manner in which information about currently broadcasted programs is presented to the user. For example, in such embodiments, the preference database is used to rearrange the order in which currently broadcasted programs are presented to cause programs having attribute information 107 rated highest by preference database 116 to be presented first. Alternatively, the preference database 116 can be used to organize information regarding the currently broadcasted programs according to the various category-value pairs stored in the database 116.

Figure 9A:
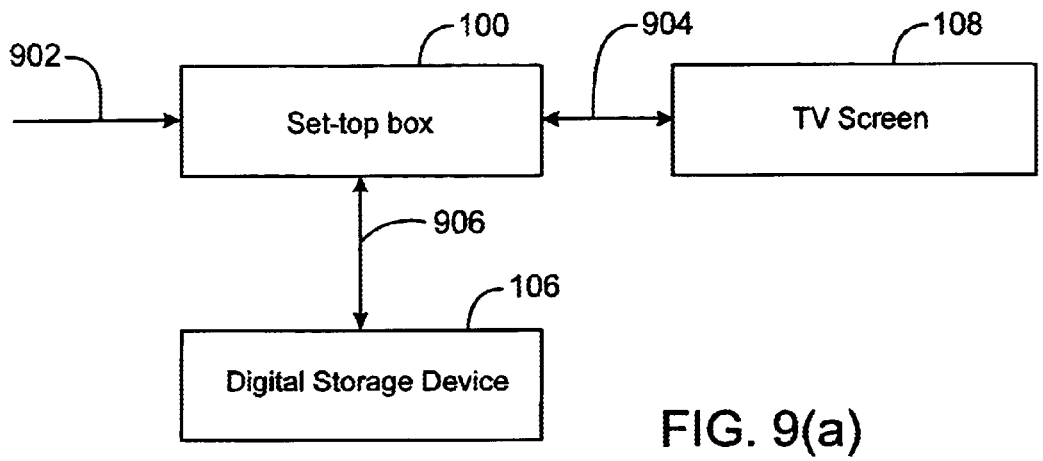
FIGS. 9(a) and 9(b) illustrate alternative hardware configurations in systems embodying the principles of the present invention.
Figure 9B:
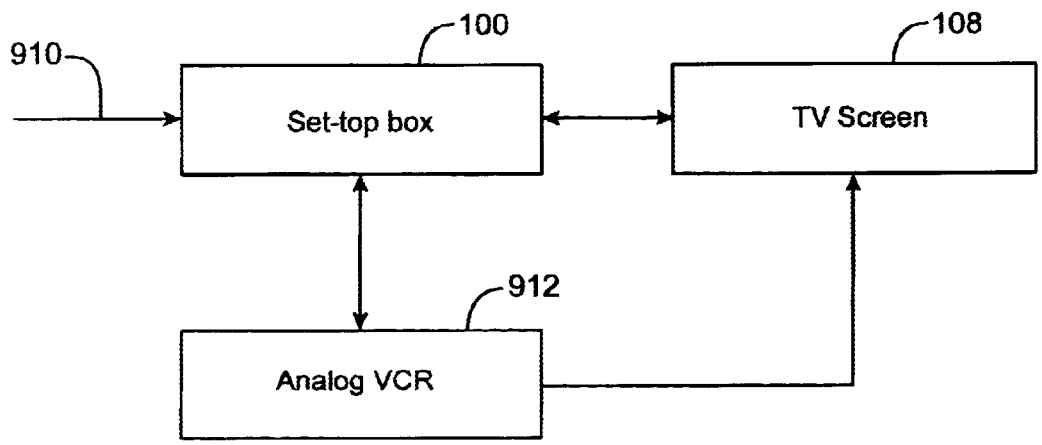

FIGS. 9(a) and 9(b) illustrate alternative hardware configurations for systems employing the principles of the present invention. FIG. 9(a) illustrates a hardware configuration that supports storage and retrieval of digitally encoded audio and video. Interface 902 is a standard digital cable or digital satellite input interface. Interface 906, which is the hardware interface to storage devices 106 preferably takes the form of an IDE or SCSI interface, or the proposed IEEE-1394 interface. Interface 906 is an NTSC or PAL encoded video interface. If the television signal 104 takes the form of an analog signal, as in the case of most current television broadcast signals, and CATV signals, then the signal 104 must be digitized and generally compressed (for example, by the MPEG-II standard) before storage on a digital storage medium such as shown in FIG. 9(a).

FIG. 9(b) illustrates an embodiment using an analog storage device 106 such as a conventional VCR. If the television signal 104 is analog then the interface 910 takes the form of a conventional NTSC or PAL interface. If the television signal 104 is digital then the interface 910 takes a form as interface 902 shown in FIG. 9(a) and a digital-to-analog converter is required to convert the received signal to analog form before storage on storage device 106.

Figure 10:
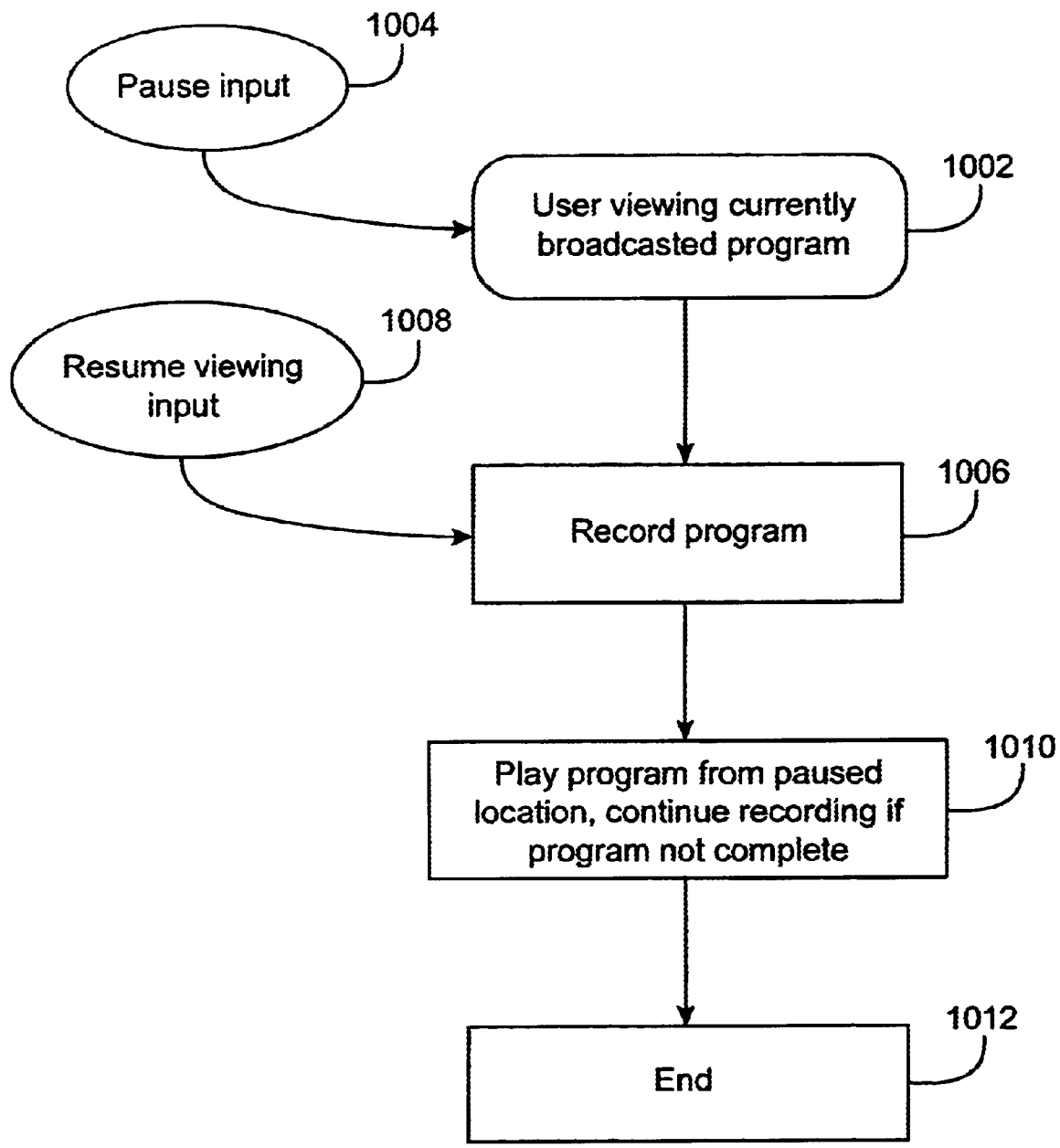
FIG. 10 is a flowchart illustrating additional aspects of operation of the television recording system of FIG. 1.

FIG. 10 illustrates operation of an automatic pause-record feature of preferred embodiments. If a user is watching a currently broadcasted program and wishes to stop or temporarily pause viewing of the program, the recording system 100 advantageously allows the program to be recorded so the user can resume viewing the program at a subsequent time. As shown in FIG. 10, at 1002, the user is viewing a currently broadcasted program. Generation of a pause input at 1004 by the user, such as by pressing of an appropriate button on a remote control coupled to the recording system 100, causes the system 100 to cause at 1006, recordation of the program being viewed by the user. The user is then free to watch another program or stop watching the television 108 altogether. At a subsequent point in time, if a resume viewing input is received, such as by pressing of an appropriate button on the aforementioned remote control, then at 1010, the recording system 100 causes the program recorded at step 1006 to be retrieved and shown on the television 108 from the point the recordation was initiated at step 1006. If the program is still being broadcast when step 1010 is initiated, then recordation of the program continues by the system 100. The user thus can easily interrupt viewing of a currently broadcast program and resume subsequent viewing.

Preferably the recording system 100 supports a variety of functions such as fast-forward, rewind and visual scan of stored programs, and other functions supported by the storage medium 106. For example, if the storage medium 106 takes the form of a VCR then the program viewing and manipulation functions will be limited to the standard VCR functions of fast-forward, rewind, forward or reverse visual scan. If the storage device 106 takes the form of a digital storage medium then more advanced program search and retrieval functions can be supported.

It is to be understood that the specific mechanisms and techniques which have been described are merely illustrative of one application of the principles of the invention. For example, the functions performed by the preference agent 110 and the recording manager 112 are illustrative of a particular embodiment. However, the division of tasks between the two modules 110 and 112 may be changed. In addition, the data formats 115, 116, 105 and 107 may also take a variety of forms. Numerous additional modifications may be made to the methods and apparatus described without departing from the true spirit of the invention.

What is claimed is:

1. Apparatus for causing recordation of television programs comprising:

a preference agent for causing retrieval of attribute information corresponding to each television program viewed by a user of said apparatus, said preference agent generating classification information indicative of viewing preferences of said user as a function of said attribute information and program deletion information indicative of priority in which television programs are deleted; and a record manager that fills a storage medium to maximum capacity and then automatically maintains the storage medium at maximum capacity with highest priority television programs by causing automatic recordation and storage to the storage medium of a plurality of television programs having attribute information that matches said classification information without requiring an explicit decision to record each of the plurality of programs on the part of the user, and by causing automatic deletion and replacement of television programs having lowest priority with newly stored television programs when required.

2. Apparatus as set forth in claim 1 further comprising a storage medium manager comprising:

means for causing deletion of television programs stored on said storage medium as a function of age of said television programs;

means for causing deletion of television programs stored on said storage medium as a function of viewing frequency of said program by said user; and means for causing deletion of television programs stored on said storage medium as a function of program deletion inputs from said user identifying one or more programs to be deleted from said storage medium.

3. Apparatus as set forth in claim 1 wherein said program deletion information is periodically updated as a function of time.

4. Apparatus as set forth in claim 1 further comprising means, responsive to one or more user inputs, for preventing updating of selected ones of said programs as a function of time.

5. Apparatus as set forth in claim 1 wherein said program deletion information is periodically updated as a function of programs viewed by said user.

6. In a system that receives television signals carrying television programs, a computer storage medium comprising apparatus for causing storage of selected ones of said television programs for subsequent viewing by a user of said apparatus, comprising:

a preference determination module, responsive to attribute information associated with television programs viewed by said user, for categorizing said attribute information in accordance with categorization parameters to generate recordation preference information, indicative of television program viewing preferences of said user; and a recordation module, responsive to user specified requests to cause recordation on said storage medium of subsequently transmitted television programs, and further responsive to said recordation preference information, for causing recordation on a storage medium of a plurality of subsequently transmitted television programs, having attribute information corresponding to said recordation preference information without requiring a user specified request to cause recordation;

wherein said recordation preference information comprises program deletion information indicative of priority in which television programs stored on said recordation module are deleted from said storage medium, as indicated by viewing preferences of said user, and wherein said recordation module fills said storage medium to maximum capacity and then maintains said storage medium at maximum capacity by responding to said program deletion information by causing replacement of television programs having lowest priority with newly stored television programs.

7. Apparatus as set forth in claim 6 wherein said recordation module is further responsive to an available capacity value, indicative of available storage capacity of said storage medium on which said subsequently transmitted television programs are stored, for causing storage of said television programs having attribute information corresponding to said recordation preference information in accordance with said available capacity value.

8. Apparatus as set forth in claim 6 wherein said recordation preference information comprises recordation priority information indicative of a priority in which programs are recorded for storage on said storage medium, and wherein said recordation preference information is generated by assigning highest priority to programs requested for storage by said user, assigning lowest priority to programs having attribute information corresponding to said recordation preference information and assigning intermediate priority to programs having attribute information corresponding to one or more user specified criteria.

9. Apparatus as set forth in claim 6 wherein said user specified requests comprise a first type of request comprising information indicative of a specific program and a second type of request comprising attribute information indicative of one or more programs having attribute information corresponding to said user specified attribute information.

10. Apparatus as set forth in claim 6 wherein said preference determination module organizes said recordation preference information in the form of a database organized according to said categorization parameters.

11. Apparatus as set forth in claim 6 wherein said recordation module comprises means, responsive to a first user request, for causing a selected program to be recorded once for storage on said storage medium, and responsive to a second user request, for causing a selected program to be recorded periodically for storage on said storage medium.

12. Apparatus as set forth in claim 6 wherein said recordation module comprises means, responsive to a category recordation request by said user, for causing recordation of programs having attribute information corresponding to user specified attribute information.

13. Apparatus as set forth in claim 6 further comprising means, responsive to a pause input from said user, for causing recordation of a currently broadcasted program being viewed by said user.

14. Apparatus as set forth in claim 6 further comprising means, responsive to a pause input from said user, for causing pausing of a recorded program being viewed by said user.

15. Apparatus as set forth in claim 6 further comprising means, responsive to a channel selection input from said user, for causing changing of a first channel corresponding to a currently broadcasted program to a second channel corresponding to a recorded program.

16. Apparatus as set forth in claim 6 further comprising means, responsive to a channel selection input from said user, for causing changing of a first channel corresponding to a recorded program to a second channel corresponding to a currently broadcasted program.

17. Apparatus as set forth in claim 6, wherein said storage means stores randomly accessible, digitally encoded data and wherein said apparatus further comprises means, responsive to a channel selection input from said user, for causing changing of a first channel corresponding to a first recorded program to a second channel corresponding to a second recorded program.

18. Apparatus as set forth in claim 17 wherein said means responsive to a channel selection input from said user is further responsive to a first pause input, for causing pausing of said first recorded program channel upon changing of said first channel to said second channel.

19. Apparatus as set forth in claim 18 wherein said means responsive to a channel selection input from said user is causes said first recorded program to continue playing upon changing of said first channel to said second channel in the absence of said first pause input.

20. Apparatus as set forth in claim 6 further comprising means, responsive to a user delete input, for causing deletion of a selected program from said storage medium.

21. Apparatus as set forth in claim 6 further comprising:

means, responsive to a user program selection input, for causing generation of a user selection menu on said television, said user selection menu providing said user with a plurality of options comprising, an option to play a selected program, hold a selected program, delete a selected program, play a selected program from the beginning of said program, fast-forward a selected program or rewind a selected program; and means, responsive to user selection of one of said options, for causing execution of said selection option.

22. Apparatus as set forth in claim 21 wherein said means for causing generation of a user selection menu on said television is responsive to a menu view input received during viewing of a program for causing generation of said user selection menu on said television.

* * * * *